US007782228B2

(12) United States Patent
Maxwell et al.

(10) Patent No.: US 7,782,228 B2
(45) Date of Patent: Aug. 24, 2010

(54) VEHICLE SPACING DETECTOR AND NOTIFICATION SYSTEM

(76) Inventors: David C. Maxwell, 51 Lexington Dr., Pennington, NJ (US) 08534; David A. Saar, 37 Todd Ridge Rd., Titusville, NJ (US) 08560

( * ) Notice: Subject to any disclaimer, the term of this patent is extended or adjusted under 35 U.S.C. 154(b) by 633 days.

(21) Appl. No.: 11/556,713

(22) Filed: Nov. 6, 2006

(65) Prior Publication Data

US 2007/0103339 A1 May 10, 2007

Related U.S. Application Data

(60) Provisional application No. 60/734,223, filed on Nov. 7, 2005.

(51) Int. Cl.
*G08B 1/00* (2006.01)
*G08G 1/054* (2006.01)
*G08G 1/095* (2006.01)
*B60Q 1/00* (2006.01)

(52) U.S. Cl. ....................... 340/932; 340/937; 340/944; 340/435; 340/436

(58) Field of Classification Search ....................... None
See application file for complete search history.

(56) References Cited

U.S. PATENT DOCUMENTS 3,720,911 A * 3/1973 Bomar, Jr. ............... 340/425.5
3,737,851 A * 6/1973 Marshall et al. ............. 340/435
4,947,353 A * 8/1990 Quinlan, Jr. ................. 702/158
5,066,950 A * 11/1991 Schweitzer et al. ......... 340/937
5,434,554 A 7/1995 Caesar
5,617,199 A * 4/1997 Dunne ....................... 356/5.01
5,734,343 A * 3/1998 Urbish et al. ............... 340/942
6,195,019 B1 * 2/2001 Nagura ....................... 340/928
6,300,883 B1 10/2001 Tyburski et al.
6,345,228 B1 2/2002 Lees
6,711,474 B1 3/2004 Treyz et al.
6,737,963 B2 * 5/2004 Gutta et al. ................. 340/435
6,760,061 B1 7/2004 Glier et al.
6,867,709 B1 3/2005 Provey et al.
7,057,501 B1 * 6/2006 Davis ......................... 340/435

* cited by examiner

*Primary Examiner*—Julie Lieu
(74) *Attorney, Agent, or Firm*—Fox Rothschild LLP; Richard Woodbridge; Perry M. Fonseca

(57) ABSTRACT

A device for the detection of tailgating between vehicles on a roadway. The device may emit ultrasonic signals on to a roadway and receive said reflected signals. The device has a processor adapted to use the received signals to determine the presence or absence of a vehicle. The processor also determines whether a vehicle is tailgating another vehicle by detecting if the time spacing between two sequential vehicles traveling in the same direction in the same lane is two second or less. The processor alerts a remote receiver when tailgating is detected. The device may also include a camera to take pictures of any vehicle determined to be tailgating. The device is preferably compact and easily portable.

13 Claims, 5 Drawing Sheets

VEHICLE SPACING DETECTOR

VEHICLE SPACING DETECTOR

ONE OR TWO TRANCEIVERS

VEHICLE SPACING DETECTOR AND NOTIFICATION SYSTEM

CROSS REFERENCE TO RELATED APPLICATIONS

This application claims the benefit of U.S. Provisional Patent Application Ser. No. 60/734,223 filed Nov. 7, 2005 which is incorporated in total by reference herein.

BACKGROUND OF THE INVENTION

1. Field of the Invention

The invention comprises a method and apparatus for efficiently, cheaply and reliably detecting tailgating between two vehicles traveling in the same direction on a roadway.

2. Description of Related Art

A major cause of traffic accidents between motor vehicles on the roadways is the incidence of one vehicle following too closely behind a second vehicle. Tailgating, as it is known, is a dangerous practice often used as an intimidation technique to force other drivers to drive faster or pull off of a roadway, lest they risk damage to themselves or their vehicles.

Efforts to deter tailgating include the doubling of traffic fines in targeted areas and the painting of markers on highways to inform people how closely they should be following other traffic. Despite these efforts, however, tailgating remains a major safety concern for drivers.

Tailgating is difficult to detect by law enforcement officers. The primary means of detecting tailgating for a law enforcement officer is simply to view traffic in motion. This is often inadequate to detect tailgating, in that drivers usually cease following too closely when they see a law enforcement officer in the distance.

Enforcement of anti-tailgating laws is a challenge for law officers because the act of tailgating is difficult to prove. While the officer may observe tailgating on a road, if the offender challenges the summons, the officer frequently has no evidence to prove the tailgating other than his own testimony. This tends to make law officers more hesitant to issue summonses for tailgating.

Prior art systems for deterrence of tailgating are inadequate to meet the needs described above. U.S. Pat. No. 7,057,501 to Davis and U.S. Pat. No. 6,737,963 to Gutta et al. disclose systems for warning a driver if tailgating is occurring, but contains no system for alerting authorities or any down stream remote location when tailgating has occurred. U.S. Pat. No. 6,711,474 to Treyz et al. discloses a system for detecting tailgating that is attached to an individual's automobile, which does not provide authorities with an easy way to target tailgating in a specific location. U.S. Pat. No. 6,760,061 to Glier et al. discloses a system for detecting vehicles using cameras mounted on the side of a roadway, but utilizes a complicated algorithm for determining the presence of a vehicle in a captured video frame. U.S. Pat. No. 6,300,883 to Tyburski discloses a system for recording traffic but no system for detecting tailgating vehicles. U.S. Pat. No. 6,345,228 to Lees discloses a system for detecting tailgating using multiple sensors embedded in a roadway but does not determine if the tailgating is a violation. It is also not portable and thus not easy-to-use or set up. The following U.S. patents may also be relevant, but are probably of less significance: U.S. Pat. Nos. 5,434,554 and 6,867,709.

In view of the forgoing, a system is needed for detecting tailgating, informing authorities when tailgating has occurred, and providing evidence of the tailgating to the authorities. In particular, a device is needed which is easily portable and may be set up alongside any roadway in order to isolate and monitor one lane of a highway. Such a device would allow for easy random deployment thereby engendering unpredictability, in order to provide the element of surprise which is crucial to law enforcement.

SUMMARY OF THE INVENTION

In one embodiment, the present invention is a device comprising at least one transmitter adapted to transmit a signal into a path of a vehicle, at least one receiver adapted to receive the signal as reflected by a vehicle, a processor connected to the at least one receiver and adapted to receive information from the receiver and determine the presence or absence of a vehicle, a memory connected to the processor containing a predetermined limit, and a notification signal adapted to notify a remote receiver if the processor determines that two vehicles are closer than the predetermined limit. In a preferred embodiment at least one transmitter is an ultrasonic transmitter, at least one receiver is an ultrasonic receiver, and both the ultrasonic transmitter and the ultrasonic receiver are connected to a transducer. While two transducers are the preferred embodiment it is also possible to use a single transducer that both sends and receives ultrasonic waves. In an alternate embodiment, multiple transducers may be used. The device may further comprise at least one camera adapted to photograph any vehicle that traverses the path, and the photograph may be transmitted to the remote receiver or recorded in a second memory. The device may be configured to isolate and monitor only one lane of traffic. In a further embodiment radar or lasers or other electromagnetic transmitters and receivers could be employed but they are not believed to be as useful overall as the preferred ultrasonic embodiments. The device is easily portable.

In another embodiment, the present invention is a method for detecting tailgating comprising arranging a transmitter adjacent to a roadway, arranging a receiver adjacent to the roadway, sending signals from the transmitter into the roadway, receiving the signals from the roadway as reflected by vehicles in a given lane, processing the signals to determine the location of vehicles with respect to each other, and if any two vehicles are closer than a predetermined time limit, typically 2.0 second or less, sending a message to a traffic enforcement officer at a remote downstream receiver. The method may further comprise capturing a photograph, i.e. digital image, of any vehicle that travels on the roadway. The photograph may also be sent to the remote receiver where a law enforcement officer can take appropriate actions such as issuing a moving violation traffic ticket. In one embodiment, the photograph is sent to the receiver only if any vehicle is determined to be closer to a second vehicle than said predetermined time limit. In one embodiment, the predetermined limit may be set to two seconds.

DETAILED DESCRIPTION

Figure 1:
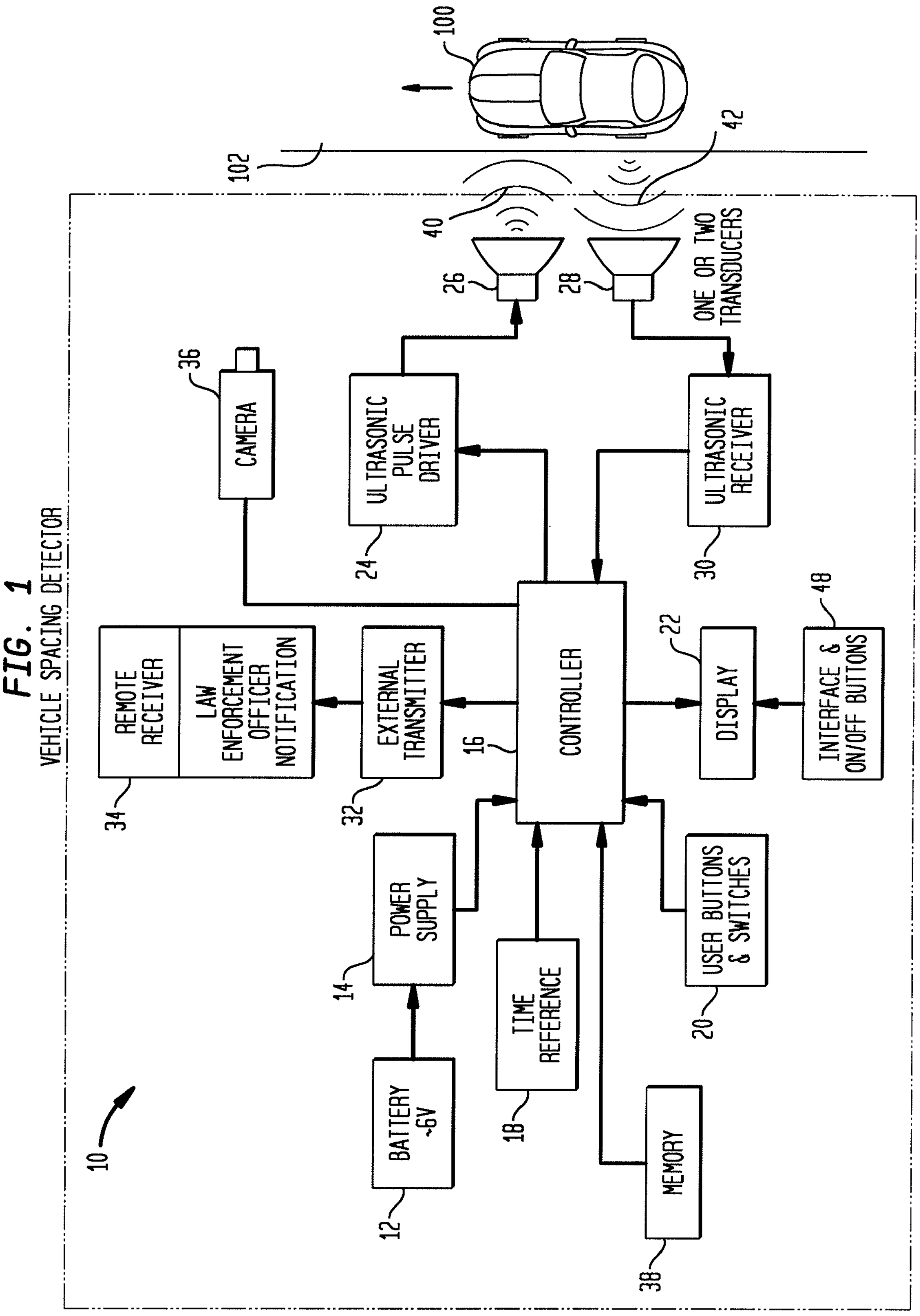
FIG. 1 depicts a device according to one embodiment of the present invention.

The invention will now be described with reference to the accompanying figures. In FIG. 1, a device 10 according to a preferred embodiment of the invention is depicted. The device 10 includes a controller/processor 16 which is preferably powered by a rechargeable battery 12, such as a laptop battery, but one skilled in the art would recognize that the device 10 may be powered by a variety of means including a standard 110-volt outlet or standard portable batteries as known in the art. The battery 12 is typically connected through a conventional power supply 14 to the rest of the circuitry. In one embodiment, the battery is rechargeable using a solar panel attached to the device.

The controller/processor 16 prompts an ultrasonic pulse driver 24 to drive transmitting transducer 26 to emit signals 40 such as ultrasonic waves toward a roadway 102. A time reference 18 provides the clocking signal to control the operation of the controller 16. Ultrasonic transmitter 26 is preferably adapted to send out short bursts of ultrasonic energy in the range of 40 to 100 kHz every 0.1 seconds. The transducer/transmitter 26 may emit a narrow or wide beam 40, but a narrow beam will reduce the effects of ultrasonic energy bouncing off the street and other extraneous objects. A standard quartz crystal, with of an accuracy of no more than 50 parts per million, may be used to control the frequency of the ultrasonic signal 40 and may also serve as the time reference for the period between the transmitted pulses and the measurement of the distance based on signal reflection time.

If any of the waves 40 reach any vehicles 100 on roadway 102, they will be reflected back as reflected waves 42 to the ultrasonic receiving transducer 28 and related ultrasonic receiver 30 within the device 10. The resulting signals will then pass to processor 16 analyzes the signal. The processor 16 will then determine the presence or absence of vehicles 100 based on the time that the ultrasonic waves 40 are sent out, the time that the waves 42 are reflected back to the device, and the speed of the waves. Using this information, the processor 16 calculates the amount of time that has elapsed between the passing of two vehicles 100. The processor 16 then compares the results of the calculation with a predetermined number that is stored in a memory 38 to determine whether a vehicle 100 is following another too closely, i.e. tailgating. The processor 16 may also store the results of any calculations along with the time of the calculations in memory 38.

For example, in one embodiment the device 10 is adapted to emit ultrasonic waves 40 every 0.1 seconds. The waves 40 travel at 1 foot per millisecond and the device 10 is preferably set up about ten feet from the roadway 102. One skilled in the art would recognize that the device 10 may be set up at another distance from the highway; ten feet is given only as an example. The preferred range is between 2 feet and 15 feet. If the device 10 receives a reflected wave that it sent out 24 milliseconds ago, that means that there is a vehicle present 12.0 feet from the device.

The device 10 preferably also comprises an external radio transmitter 32 which can send the results of tailgating calculations to a remote receiver 34 where a law enforcement officer can issue a ticket for a moving violation. The transmission is preferably a wireless transmission and may be sent as is known in the art.

In one embodiment, the device 10 further comprises a camera 36 which is adapted to photograph vehicles 100 as they pass by the device 10. In some embodiments, the processor 16 only activates the camera 36 when the processor 16 has determined that tailgating is occurring so that a picture, such as a digital image, of the offending vehicle 100 is captured. The pictures may be stored in the memory 38 for retrieval at a later time or they may be sent to the remote receiver 34 by external radio transmitter 32 or both.

The processor 16 is preferably a single chip microcontroller as known in the art. In one embodiment, the processor 16 may be a Microchip Technologies PIC16F914, which is a low-cost processor that has a pulse width modulator that can generate a square wave signal to drive the ultrasonic pulse driver. The processor 16 preferably also includes an AD converter that can be used to measure the amplitude of the reflected signal 42 received from the receiver 28, 30.

Figure 2:
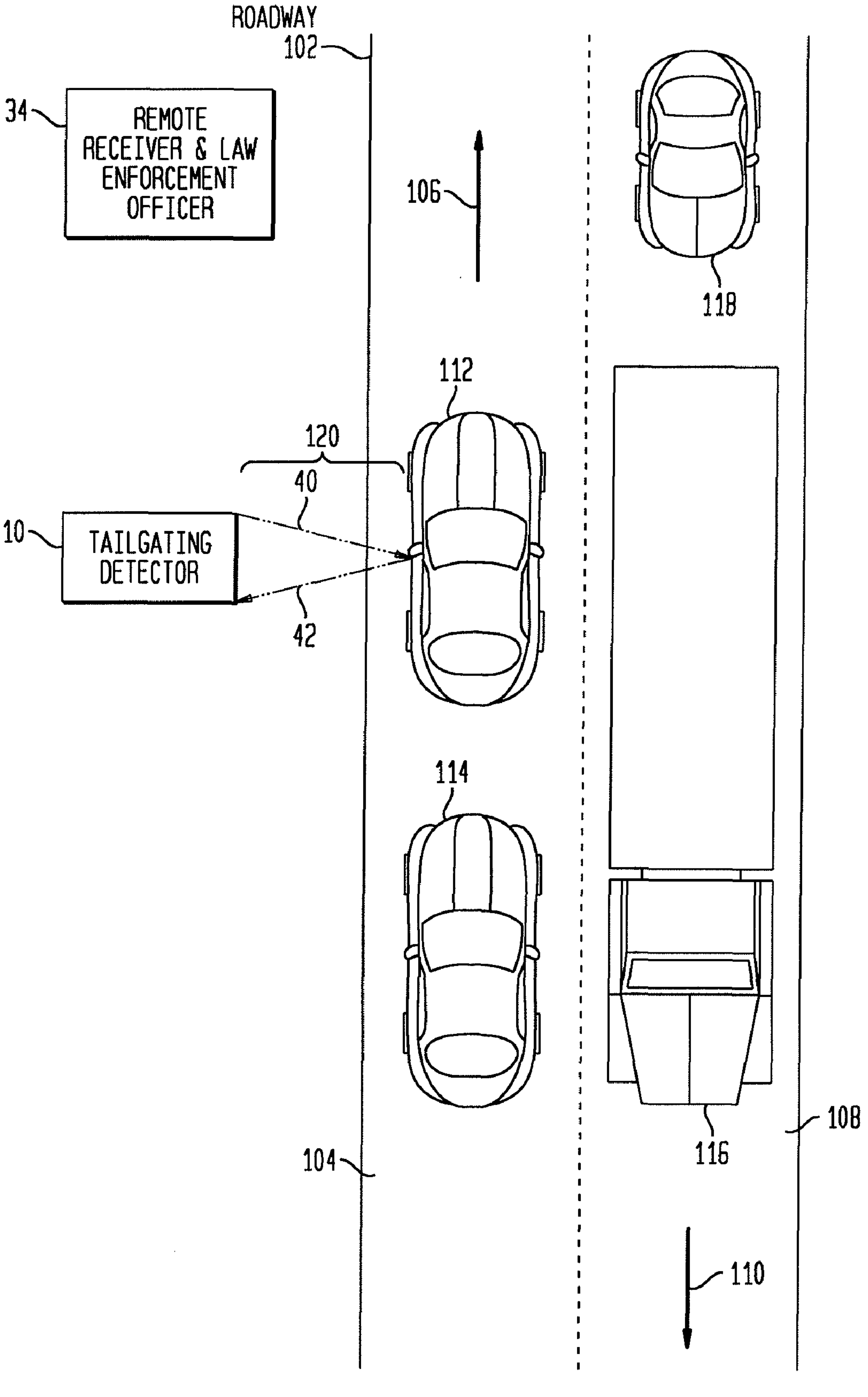
FIG. 2 depicts the device of FIG. 1 as set up adjacent to a roadway.

FIG. 2 depicts the device 10 as a portable system set up adjacent to roadway 102. The device 10 emits ultrasonic waves 40 onto the roadway 102. The roadway 102 shown in FIG. 2 comprises a north bound lane 104 where the vehicles 112 and 114 travel in the direction of arrow 106. The roadway 102 also includes a south bound lane 108 where the vehicles 116 and 118 travel south in the direction of arrow 110. The choice of north and south here is totally arbitrary and clearly the traffic could travel in almost any direction. The device 10 may be configured to emit ultrasonic waves 40 to various locations in order to monitor a lane of traffic 104. In FIG. 2, the distance 120 is show to illustrate the distance from the transducers 26, 28 to the vehicles 112, 114 in the north bound lane. The distance 120 is preferably in the range of 2-15 feet. The ultrasonic waves 42 are reflected back to the device 10 by vehicle 112. The device 10 determines whether or not the vehicle 112 is being tailgated by trailing vehicle 114. If a determination of tailgating is made, the device 10 may take a picture, i.e. digital image, with camera 36, as shown in FIG. 1, of the vehicle 114 and may send a radio signal via transmitter 32 to the remote receiver 34 and the attendant traffic enforcement officer. In other embodiments, the remote receiver 34 may issue an audio or visual signal, such as a light or sound, when tailgating is detected.

In one embodiment, the remote receiver 34 is located in the patrol car of a law enforcement agency. In this embodiment, a law officer may set up the device 10 along the side of a road and park the patrol car further along the roadway. If the device detects a tailgating infraction, it will alert the officer in the patrol car and even send the officer a picture of the tailgating vehicle. The officer may then pull over the offending vehicle as it progresses down the roadway and issue a traffic ticket or summons. The officer may access the memory on the device or a memory in the remote receiver contained in the patrol car to provide evidence of the tailgating to the driver or later to a court of law.

The memory 38 contained in the device 10 may be set to have a different determination of illegal tailgating. For example, the device 10 may be connected to a personal computer using a USB cable, wireless transmission or other means known in the art. The standard for illegal tailgating is preferably set to two seconds or less but could be set to any other limit as determined by the user.

The device 10 may also be connected to a personal computer in order to retrieve recorded information and photographs from the memory.

Figure 4A:
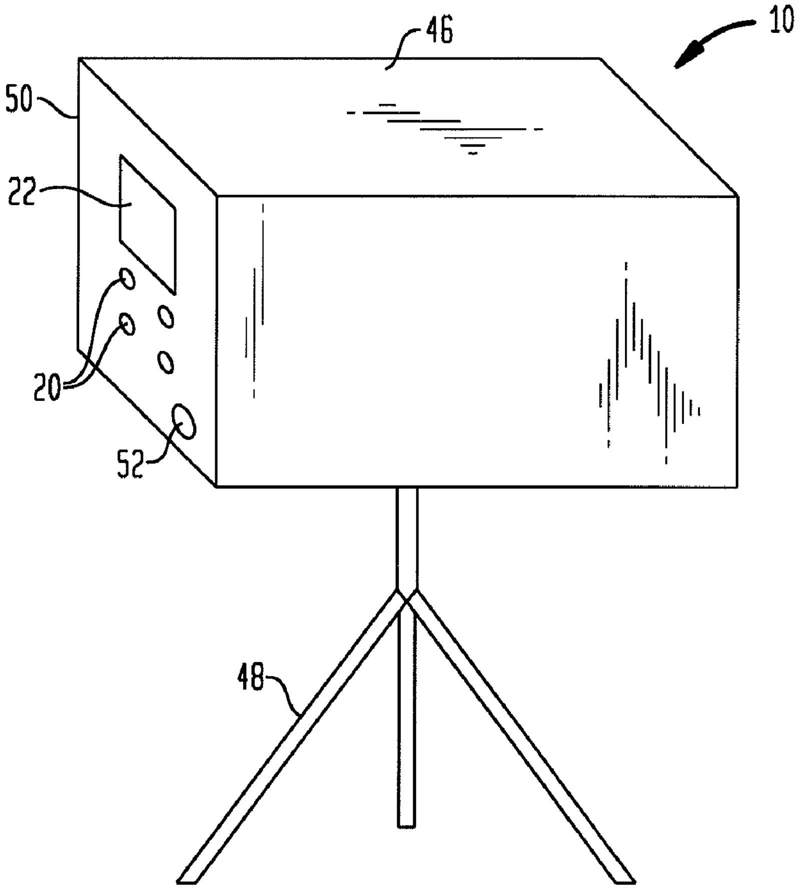
FIG. 4A is a side perspective view of a typical tailgate detector unit set up for use on the side of a road.
Figure 4B:
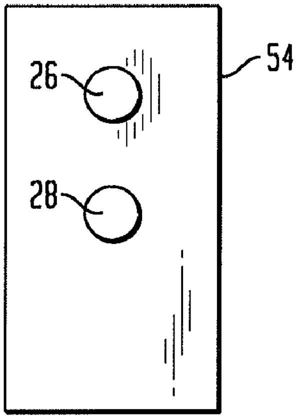
FIG. 4B is a front view of the tailgate detector unit shown in FIG. 4A.

In one embodiment, the device 10 is easily portable as shown in FIG. 4A and includes a tripod stand 48 so that it may be set up along the side of a road at a certain height which optimizes the ability of the device 10 to recognize the presence or absence of a vehicle 100. As also seen in FIG. 4A, the device 10 is housed in an enclosure which includes a back panel 50. Back panel 50 includes interface buttons 20 and an ON/OFF switch 52 which are connected to the internal interface 48 shown in FIG. 1. The front panel 54 of the housing or enclosure 46 is seen in FIG. 4B. Ultrasonic transducers 26 and 28 are visible and shown mounted in the front panel 54. In another embodiment, the device 10 may have brackets for easy attachment to a guardrail or street sign on the side of a road.

Figure 3:
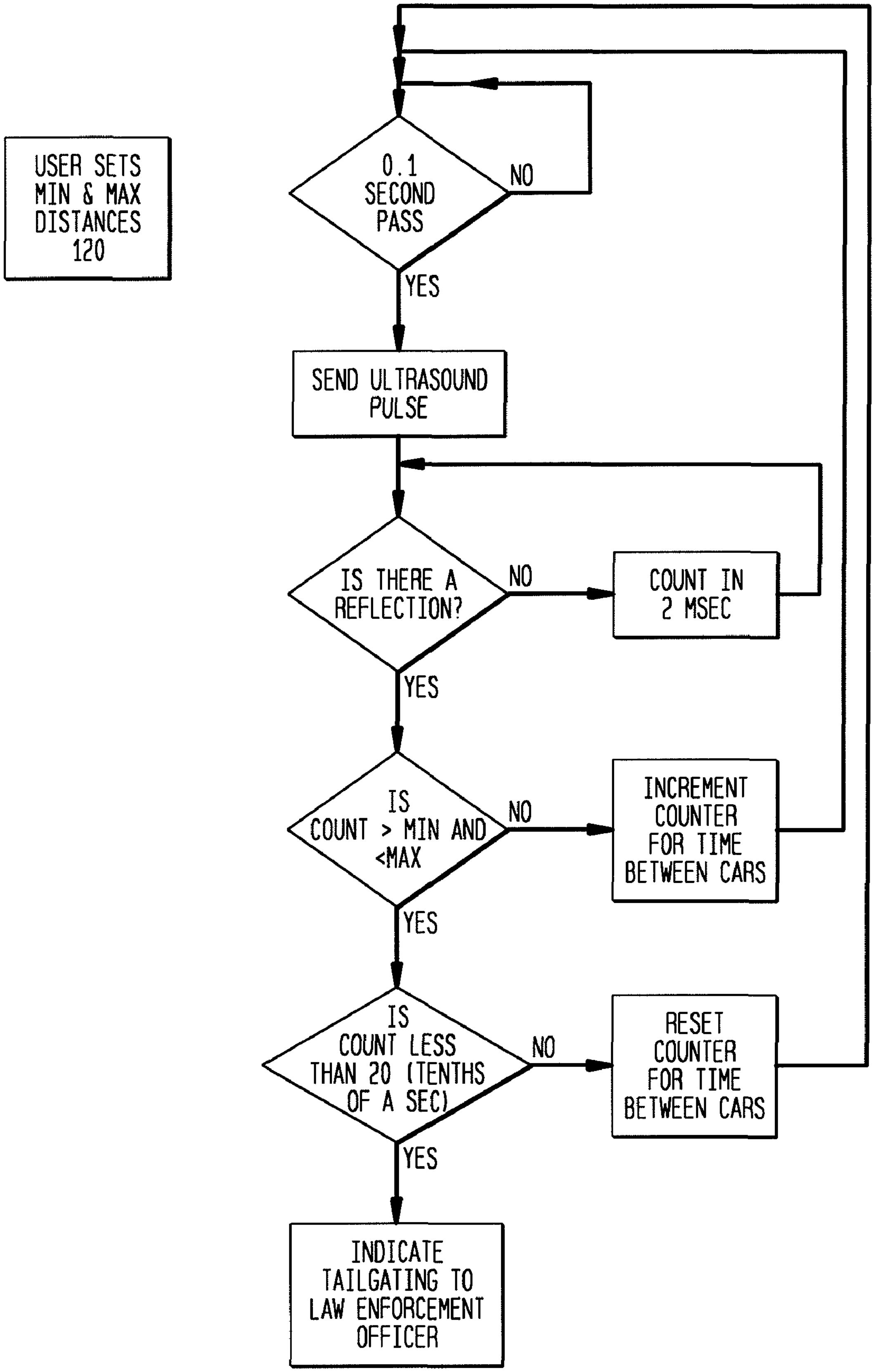
FIG. 3 is a flow diagram of a method according to the present invention.

FIGS. 3 is a box schematic diagram of the method steps that the invention 10 takes to determine if tailgating occurs. FIG. 3 is fairly self-explanatory. The primary feature is the ability to efficiently and accurately determine if there is a time gap of 2.0 seconds or less between two cars or other vehicles traveling in the same direction without being corrupted by traffic in adjacent lanes. While two seconds is the preferred threshold, it is possible to set a smaller, or in same cases, a larger threshold, if circumstances require.

Figure 5:
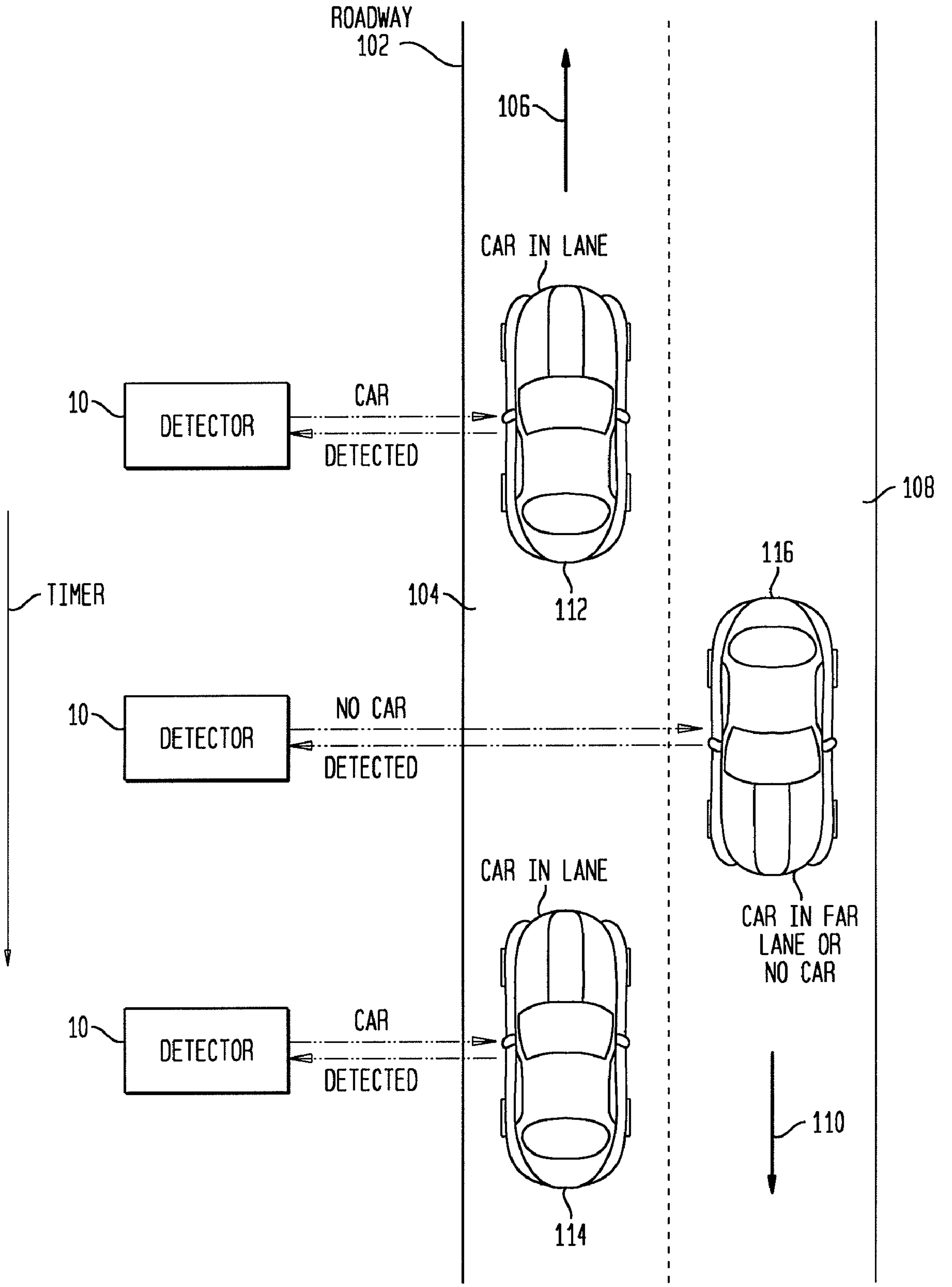
FIG. 5 is a diagram showing how the tailgate detector unit detects tailgating on a typical roadway.

FIG. 5 is a more detailed progressive illustration of the operation of the invention 10 in the context of a roadway such as seen in FIG. 2. When the first car 112 goes by the tailgate detector 10 it is detected and the time of internally recorded. The second car 116 in the adjacent lane isn't detected since it is out of range and not the focal point of the detector 10. The third car 114 then comes into range and its time is also detected and compared in detector 10 with the time of arrival of the first car 112. If the difference between the two times in 2.0 seconds or less, then a tailgating incident is detected and the information is both recorded on camera 36 and signaled down steam via transmitter 32 to a traffic enforcement officer located at the remote receiver 34.

Although the invention is described herein with the use of ultrasonic transducers, transmitters, receivers, and waves, one skilled in the art would recognize that the invention is not limited to this means of detecting the presence or absence of a vehicle. The device may also use, for example, lasers to detect the presence or absence of a vehicle. In another embodiment, the device may simply use a radio signal rather than an ultrasonic signal every time a vehicle passes the device 10. Lasers could also be used but if radio signals, like radar, or laser signals are used, then the device 10 has to discriminate much shorted time periods and the accuracy can suffer. Accordingly, ultrasonic signals like 40, 42 are preferred.

In the embodiment of the invention described above, the device has one ultrasonic transmitter, one ultrasonic receiver, and one camera. The ultrasonic transmitter and ultrasonic receiver are preferably connected to one ultrasonic transducer but multiple transducers may be used to increase precision. One skilled in the art would recognize that the device may have a plurality of transducers, transmitters, receivers, and cameras. In fact, the transmitters, receivers, and cameras need not be housed in one housing as depicted in the figures, but may actually be in separate housings and set up at different locations on a roadway. The transmitter and the receiver may be located on opposite sides of a roadway and both connected to separate transducers, for example. However, one compact, portable device as depicted in FIGS. 4A and 4B is the preferred embodiment of this invention.

The device 10 may also include a user interface 20, 48, 52 with a screen 22, such as an LCD screen, to inform the user as to the status of the device. The device may include a touchscreen as known in the art or a series of buttons 20 to turn the device on, set the distance of the waves to be emitted, or set the threshold for determining tailgating.

The device 10 may further include means for determining the speed of passing vehicles, such as a radar gun. In some embodiments, the speed may be used by the processor in the calculation to determine whether a vehicle is tailgating. For example, the definition of tailgating may be set in the device's memory to be less than ten feet per 10 mph of the speed of the moving vehicles.

FIG. 3 depicts a flow diagram of the various steps of a method according to a preferred embodiment of the present invention. The variable "vehicle present" is preferably set to "no" when the device is started. Upon activation, the device sends an ultrasonic signal at a predetermined time interval, such as every 0.1 seconds. The device then determines whether the signal has been reflected to the device. If no reflection is detected by the device, the device determines whether the variable "vehicle present" is set to "yes." If it is not, that means that no reflection is detected and no vehicle was present when the previous signal was sent. The device then sends the next signal. If "vehicle present" is set to "yes" and there is no reflection, that means that a vehicle has just passed the device. The "vehicle present" variable is set to "no" and the current time is recorded as "vehicle passed," denoting the time that the last vehicle passed the device.

If the device detects a reflection, that means that a vehicle is in front of the device. The device determines whether "vehicle present" is set to "yes." If it is, that means that this vehicle has already been detected by the device at the previous signal. The device then continues to send signals.

If the device detects that there is a reflection and "vehicle present" is set to "no," that means that this is the first time a signal has been received from this vehicle. The device will set "vehicle present" to "yes" to denote that a new vehicle is now passing the device. The current time is then recorded as "vehicle appeared time" to denote the precise time that the vehicle started to pass the device.

The device then performs a calculation to determine whether "vehicle appeared time" is less than a predetermined amount after "vehicle passed." This means that the device determines exactly how much time has elapsed since the previous vehicle passed the device and this vehicle appeared. If the time is not less than a predetermined amount, such as two seconds, the vehicle is determined not to be tailgating the previous vehicle and the device continues sending ultrasonic signals. If the time is less than a predetermined amount, such as two seconds, the current vehicle is tailgating the previous vehicle. The tailgating vehicle is photographed and a signal is sent to the remote unit to alert the remote unit of a tailgating infraction. One skilled in the art would recognize that the photograph step is optional and a signal comprising a notification may be sent to a remote unit without a photograph.

In an alternate embodiment of the invention, the device may simply be used to count passing vehicles or to count instances of tailgating. A private homeowner, for example, may be interested in counting passing vehicles in order to lobby a government to install a traffic light or reduce the speed limit. A private homeowner or governmental entity may also be interested in counting the instances of tailgating occurring on a street for traffic studies or possible targeting of the street for enforcement purposes.

Thus, a device according to the present invention measures the amount of time that elapses between two vehicles passing along a road and determines whether a vehicle is tailgating. If tailgating is detected, a remote unit is alerted. This system serves to deter tailgating and create a safer driving environment for all motorists.

Although illustrative embodiments of the present invention have been described with reference to the accompanying drawings, it is to be understood that the present invention is not limited to those precise embodiments and various modifications may be made by persons of ordinary skill in the art without departing from the scope and spirit of the invention.

The invention claimed is:

1. An apparatus for detecting tailgating between vehicles traveling in the same direction comprising:

a portable housing which houses at least one transmitter and at least one receiver, the portable housing is adapted to be mounted on the side of the road, the at least one transmitter is adapted to automatically transmit a signal substantially at a right angle into a preselected lane of which a vehicle traverses, the at least one receiver adapted to receive the signal as reflected by the vehicle to detect the presence of a vehicle in the preselected lane, a processor connected to the at least one receiver and adapted to receive information from the receiver and to determine the tailgating distance between a leading vehicle and a trailing vehicle based upon successive detection of the presence of traversing vehicles, a memory connected to the processor containing a predetermined time interval correspondence to a predetermined tailgating limit, and notification means for notifying a law enforcement officer if the determined distance between the leading and trailing vehicles in the preselected lane are closer than a predetermined time interval.

2. The apparatus of claim 1 wherein the at least one transmitter is at least one ultrasonic transmitter and the at least one receiver is at least one ultrasonic receiver, and both the at least one ultrasonic transmitter and the at least one ultrasonic receiver are connected to a transducer.

3. The apparatus of claim 2 wherein said notification means comprises;

an external transmitter means for generating a radio signal indicative of the detection of tailgating; and, a remote receiver mean to receive said radio signal and notify said law enforcement office so said officer can issue a traffic ticket.

4. The apparatus of claim 3 wherein said apparatus is set up to monitor one, and only one, lane of traffic at a time.

5. The apparatus of claim 4 wherein said apparatus detects if the time interval is less than 2.0 second and, if it is, causes said notification means to notify said law enforcement official.

6. The apparatus of claim 5 further comprising:

a camera attached to said apparatus for recording a image of said tailgating vehicle.

7. The apparatus of claim 6 wherein said predetermined time interval is approximately 2 seconds or less.

8. A method for detecting tailgating between vehicles traveling in the same direction comprising:

arranging an easily portable housing comprising a portable housing which houses at least one transmitter and at least one receiver adjacent to a roadway, sending signals from the transmitter into a preselected lane of the roadway without assistance of a human attendant, receiving the signals at the receiver from the roadway as reflected by vehicles in the preselected lane, processing the signals to determine the time spacing of vehicles with respect to each other; and, if the time spacing between two vehicles is less than a predetermined time limit, sending a message to notify a law enforcement officer.

9. The method of claim 8 wherein said signals are in the ultrasonic range.

10. The method of claim 9 wherein said predetermined time limit is 2.0 seconds or less.

11. The method of claim 10 further comprising:

capturing the image of any vehicle that travels on the roadway.

12. The method of claim 11 further comprising:

sending said image to said law enforcement officer.

13. The method according to claim 8, wherein the signals from the transmitter are focused on a single traffic lane.

* * * * *